United States Patent [19]

Craun et al.

[11] Patent Number: 4,906,693

[45] Date of Patent: Mar. 6, 1990

[54] TRANSESTERIFICATION CURE OF THERMOSETTING COATINGS

[75] Inventors: Gary P. Craun, Berea; David L. Trumbo, Parma Hts., both of Ohio

[73] Assignee: The Glidden Company, Cleveland, Ohio

[21] Appl. No.: 157,249

[22] Filed: Feb. 18, 1988

[51] Int. Cl.$^4$ .......................... C08K 3/24; C08K 5/15; C08L 67/00

[52] U.S. Cl. .................................. 525/176; 525/428; 525/439; 525/440; 525/444; 525/475; 528/176; 528/181; 528/275; 528/280

[58] Field of Search ............... 525/176, 428, 439, 440, 525/444, 475; 523/400, 427

[56] References Cited

U.S. PATENT DOCUMENTS

| | | | |
|---|---|---|---|
| 4,458,054 | 7/1984 | Schmözer et al. | 525/327.3 |
| 4,742,096 | 5/1988 | Craun | 523/400 |
| 4,749,728 | 6/1988 | Craun et al. | 523/400 |

Primary Examiner—Allan M. Lieberman
Attorney, Agent, or Firm—Thomas M. Schmitz

[57] ABSTRACT

Transesterification curing of ester polymers and hydroxyl polymers is effected by the inclusion of a transesterification catalyst comprising a catalytic amount of epoxy resin and certain inorganic salts.

18 Claims, No Drawings

TRANSESTERIFICATION CURE OF THERMOSETTING COATINGS

BACKGROUND OF THE INVENTION

This invention relates to copending Serial No. 871,444 filed June 6, 1986, and the disclosure thereof is incorporated herein by reference.

This invention pertains to thermosetting polymeric binders useful in protective coatings and particularly to a transesterification cure catalyst comprising minor amounts of an epoxy resin in combination with an inorganic salt selected from halogens, azides, cyanides, and hydroxides to actively promote transesterification coreaction between matrix polymers containing reactive hydroxyl groups and polymers containing coreactive ester groups.

Transesterification of a simple ester compound with a simple alcohol compound is known to occur under basic conditions. The transesterification reaction is an equilibrium reaction which can be driven to completion by removing the alcohol moiety evolving from the cleaved ester. If the cleaved alcohol moiety is a low molecular weight lower alkyl alcohol such as methanol or ethanol, removal by evaporation is quite easy. It has been found that transesterification as a curing mechanism for crosslinking polymers used in paint coatings provides an attractive cure mechanism for producing thermosetting protective coatings since cleaved lower alkyl alcohols are easily removed from the coating by simple air dry evaporation thereby driving the transesterification reaction to completion.

Several patents disclosed the use of acids, bases, metal salts, and organic metal complexes as catalysts for transesterifying polymers such as U.S. Pat. Nos. 4,362,847, 4,376,848, 4,332,711, and U.S. Pat. No. 4,459,393 wherein octoates or naphthenates of lead, zinc, calcium, barium, and iron are disclosed as transesterification catalysts.

Green U.S. Pat. No. 4,559,180 discloses an organic syntheses process for simple transesterification of very low molecular weight simple carboxyl ester compounds with similar simple alcohols by reacting the same in the presence of an epoxide and a Lewis base (containing a Group V element) or a cyclic amidine. The Green patent does not pertain to coatings or polymers but merely discloses simple chemical reactions between very low molecular weight chemical compounds.

Dante and Parry have shown that phosphonium halides, such as ethyltriphenyl phosphonium iodide, are efficient catalysts for (a) 1,2-epoxide reactions with phenols to yield hydroxy ethers (U.S. Pat. No. 3,477,990), and (b) polyepoxide reactions with carboxylic acids or acid anhydrides (U.S. Pat. No. 3,547,885). The patent suggest that polyepoxides and phenols can be reacted to form phenolic hydroxy ethers with phosphonium salts as catalysts. The counterion of the phosphonium moiety is the anion portion of a carboxylic acid, or acid ester, such as in ethyltriphenyl phosphonium acetate (U.S. Pat. No. 3,948,855).

Barnhoorn et al (U.S. Pat. No. 4,459,393) teach self-crosslinking thermosetting resin compositions obtained from the reaction of a beta-hydroxyalkyl ester of an alpha,beta-carboxylic acid with a primary mono- or polyamine to give a product having 1 to 2 amino hydrogens and further reacted with a polyglycidyl ether of a polyhydric phenol so that the final resin adduct has more than one beta-hydroxyalkyl ester group and amine groups having 1 to 2 amine hydrogen atoms per molecule. Transesterification catalysts known in the art are taught.

Subramanyam et al (U.S. Pat. No. 4,376,848) teach the preparation of water dilutable electrocoating compositions having tertiary amino-containing basic binders by reacting a secondary amino group compound with an olefinically double-bonded epoxy and the copolymerization of this produce with at least one ethylenically bonded polymerizable monomer wherein said binders can self-cure and be cured in combination with amine resins and/or phenolic resins. Again, common transesterification catalysts are taught.

It now has been found that a transesterification catalyst combination of an inorganic salt of a halide, an azide, a cyanide, or a hydroxide and a minor amount of a catalytic epoxy compound containing oxirane functionality efficiently, activates transesterification thermosetting cure reaction between a polymer containing a carboxyl ester linkage and a polymer containing an alcohol group. The cation preferably is a monovalent inorganic element selected from sodium, potassium, lithium, calcium or iron. Polyvalent cations such as calcium and iron are also useful. Coreactive ester polymers and hydroxyl polymers can be efficiently crosslinked or cured at room temperature or above room temperature in accordance with this invention. The curing mechanism satisfies an ongoing need in the coatings field for improved and more efficient curing mechanisms which are less toxic and conform to VOC standards. This invention overcomes dificiences of current crosslinking systems based on amine resin/aldehyde condensation compositions reactive with hydroxyl and other acidic functionality which exhibit a number of deficiencies including high cure temperatures, pH dependence, formaldehyde evolution, and coloration. These deficiencies with the novel catalyst comprising an epoxy resin/inorganic salt acid where cure is effected between an ester polymer and hydroxyl containing polymer. For instance, hydroxyl functional polyesters can be crosslinked with dimethyl adipate, where methanol is liberated from the coating during cure as ester crosslinks form. These and other advantages of this invention will become more apparent by referring to the detailed description and the illustrative examples.

SUMMARY OF THE INVENTION

Briefly, the invention pertains to thermosetting protective coatings based on a transesterification cure of a matrix binder comprising a carboxyl ester polymer and a hydroxyl containing polymer where the transesterification is activated by a catalyst combination of catalytic epoxy containing oxirane functionality and inorganic salt. The catalyst combination is added in amounts of between about 1 and 20 weight parts of catalytic epoxy resin containing oxirane functionality and between about 0.1 and 10 weight parts the inorganic salt per 100 weights part of matrix thermosetting binder polymer.

DETAILED DESCRIPTION OF THE INVENTION

The invention is based on a transesterification catalyst comprising the combination of a inorganic salt and a catalytic epoxy resin utilized to activate a transesterification cure between a polymer containing a carboxyl ester ("ester polymer") and a polymer containing hydroxyl groups.

Referring first to the inorganic salt used in conjunction with catalytic epoxy resin to form the transesterification catalyst in accordance with this invention, suitable inorganic salts are derived from inorganic cations such as sodium, potassium, lithium, calcium and iron combined with inorganic anions selected from halogens including chlorides, bromides, and iodides, as well as azides, cyanides, and hydroxides. The inorganic salts can be combined with catalytic epoxy resin to activate a transesterification cure in accordance with this invention.

Referring next to the epoxy resin containing oxirane functionality used as a cocatalyst with the monovalent inorganic salts, catalytic epoxy resins can be a monomeric or polymeric epoxide selected from the group consisting of $C_{2-18}$ alkylene oxides, arylalkylene oxides, cycloaliphatic oxides, and a polymeric or oligomeric epoxide having at least one epoxide group per molecule. The most suitable catalytic epoxy resins comprise glycidyl ethers of bisphenol or glycidyl addition polymers. Glycidyl ethers of bisphenol include typically glycidyl ethers of polymers based on bisphenol A ( or similar bisphenols) such as bisphenol A diglycidyl ether (Epon 828, Shell), and higher molecular weight versions, linear or branched, having one, two, or more glycidyl groups per molecule. Glycidyl addition polymers comprise acrylic polymers containing copolymerized ethylenically unsaturated monomers including glycidyl methacrylate or glycidyl acrylate monomers. Other epoxy resins containing monofunctional oxirane are useful including oleic acid oxide, t-butyl phenyl glycidyl ether and the like.

Examples of catalytic epoxy resins containing oxirane functionality useful for the in-situ preparation of the cure catalyst include $C_{2-18}$ alkylene oxides and oligomers and/or polymers having epoxide functionality including multiple epoxy functionality. Particularly suitable alkylene oxides include propylene oxide, 1,2-butylene oxide, 1,2-hexylene oxide, tert-butyl glycidyl ether, phenyl glycidyl ether, glycidyl acetate, and glycidyl benzoate. Useful multifunctional oxiranes include bisphenol A diglycidyl ether, diglycidyl adipate, 1,4-diglycidyl butyl ether, Novalac resins and other commercial epoxy resins. Bisphenol A diglycidyl ether is a preferred epoxide. Such epoxy resins comprise a low molecular weight resin product by bisphenols reacted with epichlorohydrin having a molecular weight between about 400 and 4000 as measured by GPC. Preferred epoxy resin comprise linear polymer chains of repeating units of diglycidyl compounds with various bisphenols such as bisphenol A or bisphenol-5. Also useful are acrylic polymers having epoxide functionality such as acrylic copolymers derived from glycidyl methacrylate. Oxirane compounds can include isobutylene oxide (2-methyl-1, 2-propene oxide), 2-methyl-1,2-hexene oxide, 2-phenyl-1, 2-propene oxide (alpha-methyl styrene oxide), 2-phenoxy methyl-1, 2-propene oxide, and the like. Other oxiranes include 2,3-dimethyl-2-butene oxide, 2-methyl-2-butene oxide, oleic acid oxide, and 1-phenyl propene oxide.

The catalyst combination can comprise on a weight basis between 0.1 and 20 of a inorganic salt per 1 to 20 weight parts of catalytic epoxy resin containing oxirane functionality. The catalyst combination is added to the coreactive matrix polymers at a level between 2 and 20 weight parts catalyst combination per 100 weight parts coreactive matrix polymers.

Referring next to matrix polymers useful in this invention and adapted to be transesterification, the useful matrix polymer comprise a wide range of polymers, provided that polymer chains contain a carboxyl ester structure and a hydroxyl functional group. Useful coatings include solvent or water dispersed polymers comprising a wide variety of monomers, oligomers, and resins having the requisite hydroxyl and/or ester functionality including polyester, polyacrylates, polyepoxides, polyamides, polyamines, polyurethanes, monoalcohols, monoesters, polyols and mixtures thereof. Patents disclosing useful ester polymers and hydroxyl polymer adapted to be coreacted in a transesterification reaction include U.S. Pat. Nos. 4,489,182, 4,362,847 and U.S. Pat. No. 4,332,711 which disclose non-acidic, hydroxyl polymers and non-acid polyester polymer having beta-ester groups and said patents are incorporated herein by reference. Further patents include U.S. Pat. Nos. 4,376,848 and 4,459,393 pertaining to hydroxyl and ester polymers. Films prepared from blends of polyesters containing hydroxyls and esters of low boiling alcohols have good physical properties and exceptionally low raw material costs.

Hydroxyl functional polyesters with two or more, preferably three or more, primary hydroxyls per molecule (average composition) can be cured in accordance with this invention with diesters such as diethylsuccinate, dimethyl adipate, etc., and/or polyesters with terminal esters of low boiling alcohols such as the reaction products of these diesters with diols, triols, etc. Cure with a diester has the advantage that the system is of low viscosity. No solvents are needed in addition to the reactive diesters. Useful aliphatic diesters include dimethyl glutarates, dimethyl-succinate, dimethyl adipate, diethyl adipate, diisopropyl sebacate and the like. Aromatic esters of use include dimethyl isophthalate, dimethyl terephthalate, diethyl isophthalate, diethyl terephthalate, trimethyl-1,3,5-benzene tricarboxylate, trimethyl-1,3,5-naphthalene tricarboxylate and the like. Cycloaliphatic esters can include for example, dimethyl, diethyl or dipropyl 1,4-cyclohexane dicarboxylate, 1,3-cyclohexane dicarboxylate, and trimethyl 1,3,5-cyclohexane tricarboxylate. More complex polyfunctional ester compounds can include those mixtures that arise from condensation of the above simple ester compounds with diols, polyols, diamines and amino alcohols wherein an excess of ester functionality is mentioned so as to provide soluble or fusible adducts.

Polyesters are generally prepared with mixtures of aromatic dicarboxylic acids and linear saturated dicarboxylic acids having between 1 and 10 linear carbon atoms such as adipic, azelaic, succinic, glutaric, pimelic, suberic or sebacic acid to produce low molecular weight polyesters. Aromatic dicarboxylic acids (anhydrides) include phthalic, isophthalic, terephthalic, and tetrahydrophthalic. Suitable glycols include triols such as trimethylol propane, and trimethylol ethane, and other polyols such as pentaerythritol, and linear aliphatic glycols having 2 to 8 carbon atoms such as 1,3 or 1,4 butylene glycol, 1,6 hexane diol, neopentyl glycol, propylene glycol, diethylene or dipropylene glycols, and similar linear glycols. Useful hydroxyl functional polyesters can be prepared by the usual esterification procedures from (1) diols and polyols with dicarboxylic acids and polycarboxylic acids (2) by transesterification of diols and polyols with diesters and polyesters of carboxylic acids, or (3) by reactions in which both esterification and transesterification are used to form polyesters. On a molar basis, an excess of hydroxyl functionality is used to obtain hydroxy functional polymers. Small amounts of unreacted ester or acid remain in the polymers.

Polyesters with terminal ester functionality can be used to crosslink hydroxyl functional polyesters and/or diols and polyols. Ester functional polyesters can be prepared by (1) transesterification diols and polyols with dicarboxylic acids, followed by transesterification with diesters.

Polyesters with both hydroxyl and terminal ester functionality are self-curing. They can be prepared by (1) transesterification of diols and polyols with diesters and polyesters of carboxylic acids, (2) esterification of dicarboxylic acids with diols and polyols to low acid number, followed by transesterification with diesters of carboxylic acids. Degree of reaction in self-cure polyesters must be controlled such that the product viscosity is in a practical range.

Polyesters generally are prepared with low acid numbers, less than 10, although higher acid numbers may aid in pigment dispersion. Molecular weights for solvent borne paints generally range from about 300 to 2000 number average molecular weight (as measured by GPC), while polyesters for powder paints may range up to 25,000 number average molecular weight or higher.

Hydroxyl functional epoxy polymers can be prepared from epoxy resin by reaction with a carboxylic acid which forms an ester and a hydroxyl group. This hydroxyl group formed on the backbone of the epoxy resin actively participates in transesterification crosslinking reactions. Self-curing resins can be derived from epoxy resins by reacting epoxy resins with monomethyl esters of dicarboxylic acids or anhydrides. Thus, succinic anhydride is combined with a slight molar excess of methanol, and warmed to form methyl succinate. The diglycidyl ether of Bisphenol A is then added at a 1:1 mole ratio of epoxy to carboxylic acid, and upon warming to 100°-150° C., the epoxy oxirane group is consumed by the carboxylic acid. Epoxy resin with active glycidyl groups is then added with the conjugate base of a weak acid (such as potassium propionate) to catalyze the transesterification of the methyl ester and the backbone hydroxyl groups.

Hydroxyl functional addition polymers, and particularly acrylic polymers, can provide a hydroxyl functional polymer for the transesterification cure. Acrylic addition polymers are produced by copolymerization of ethylenically unsaturated monomers where peroxide or azo catalysts initiate copolymerization of the monomer double bonds. Polymerizable ethylenically unsaturated monomers contain carbon-to-carbon unsaturation and include vinyl monomers, acrylic monomers, allylic monomers and acrylamide monomers. Vinyl esters include vinyl acetate, vinyl propionate, vinyl butyrates, vinyl benzoates, vinyl isopropyl acetates and similar vinyl esters. Vinyl halides include vinyl chloride, vinyl fluoride, and vinylidene chloride. Vinyl aromatic hydrocarbons include styrene, methyl styrenes and similar lower alkyl styrenes, chlorostyrene, vinyl toluene, vinyl naphthalene, divinyl benzoate, and cyclohexene. Vinyl aliphatic hydrocarbon monomers include alpha olefins such as ethylene, propylene, isobutylene, and cyclohex as well as conjugated dienes such as butadiene, methyl-2-butadiene, 1,3-piperylene, 2,3 dimethyl butadiene, isoprene, cyclopentadiene, and dicyclopentadiene. Vinyl alkyl ethers include methyl vinyl ether, isopropyl vinyl ether, n-butyl vinyl ether, and isobutyl vinyl ether.

Hydroxyl functional copolymers are produced by specifically copolymerizing hydroxylated monomers including hydroxy alkyl acrylates such as 2-hydroxy ethyl acrylate and methacrylate, 2-hydroxypropyl acrylate and methacrylate, and similar hydroxy alkyl acrylates. Carboxyl functional monomers are avoided.

Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates.

Hydroxyl functional polyurethane polymers can be transesterification with ester functional polymers in accordance with this invention. Hydroxyl functional polymers typically contain urethane groups in the polymer backbone and are produced by reacting excess equivalents of diol or polyol with lesser equivalents of di- or polyisocyanate. The polyisocyanates can be di- or triisocyanates such as for example 2,4 and 2,6 tolyene diisocyanate, phenylene diisocyanate; hexamethylene or tetramethylene diisocyanate, 1,5 naphthalene diisocyanate, ethylene or propylene diisocyanate, trimethylene or triphenyl or triphenylsulfone triisocyanate, and similar di- or triisocyanates. The polyisocyanate can be generally selected from the group of aliphatic, cycloaliphatic and aromatic polyisocyanates such as for example hexamethylene 1,6-diisocyanate, isophorone diisocyanate, diisocyanate, 1,4-dimethyl cyclohexane, diphenylmethane diisocyanate 2,4-tolyene diisocyanate, 2,6-tolyene diisocyanate and mixtures thereof, polymethylene polyphenyl polyisocyanate. Useful polyols preferably contain two or more hydroxyl groups for co-reaction with the isocyanate groups. Useful polyols are: -diols such as ethylene glycol, propylene glycols, butylene glycols, neopentyl glycol, 14-cyclohexane dimethanol, hydrogenated bisphenol A, etc.; triols such as glycerol, trimethylol propane, trimethylol ethane; tetrols such as pentaerythritol; hexols such as sorbitol, dipentaerythritol, etc.; polyether polyols produced by the addition of alkylene oxides to polyols; polycaprolactone polyols produced by the addition of monomeric lactones to polyols, such as caprolactone; hydroxy terminated polyesters produced by condensation of any of the above polyols with polybasic acids in such ratio that the final condensate is substantially free from carboxyl acidity and has a molecular weight range up to about 500.

The presence of carboxylic acid functionality in the matrix polymers or coating will retard the onset of transesterification. If excessive amounts of carboxylic acid are present, the oxirane component will be entirely consumed without the formation of the catalytic intermediate necessary for transesterification, although the retarding effect of small quantities of carboxylic acid can be used advantageously to improve the package stability of the instant coating compositions. Hence, polymeric binders should be substantially free of carboxylic functionality and have an Acid No. less than 20 and preferably less than 10.

Other useful hydroxyl compounds comprise aliphatic polyols including ethylene glycol, propylene glycol, neopentyl glycol, 1,3-butylene glycol, 1,4-butane diol, 1,6-hexane diol, trimethylol propane, trimethylol ethane, glycerol, pentaerythritol, and the like. Various ether polyols can be used such as diethylene glycol, triethylene glycol, dipropylene glycol, dipentaerythritol and the like. Cycloaliphatic polyols can be used and include cyclohexane-1, 4-dimethanol, sorbitol and the like. Aromatic based aliphatic polyols such as 1,3-dimethylol benzene, 1,4-dimethylol benzene, 1,3,5-trimethylol benzene, 1,2,5-trimethylol benzene and the like.

The polymeric polyol component of the coating compositions can be selected from a wide variety of hydroxyl group-containing polymers such as alkyd resins, polymers resins, hydroxyl group-containing acrylic polymers, hydroxyl group-containing epoxy resins. The molecular weights of the polymeric polyols can vary over a wide range depending upon their type and on whether the coating composition s organic solvent based or aqueuos based and also on the desired performance characteristics of the coating. Polyester, epoxy and alkyd resins can have molecular weights as low as about 200 and as high as about 50,000, but preferably are usually in the range of about 500 to 5,000. The hydroxyl content of the polymeric polyol should be sufficient to cure to a solvent-resistant coating. Generally, the hydroxyl number of the polymeric polyol will be at least about 40 and preferably will be in the range of about 100 to 300, based on resin solids. Examples of hydroxyl polymers useful as suitable crosslinking agents are those which are formed from reacting a polycarboxylic acid or its functional equivalent thereof with one or more polyols. Examples of suitable polycarboxylic acids include dicarboxylic acids such as saturated aliphatic dicarboxylic acids, for examples, adipic acid and azelaic acid; aromatic acids such as isophthalic acid and terephthalic acid; ethylenically unsaturated dicarboxylic acids such as fumaric acid and itaconic acid, or functional equivalents of the acids such as anhydrides where they exist and lower alkyl esters of the acids can be used. Examples include succinic anhydride, phthalic anhydride and maleic anhydride.

The molecular weight of both the ester polymers and the hydroxyl polymers adapted to be transesterified in accordance with this invention preferably are lower molecular weight polymers having number average molecular weight broadly between 200 and 50,000 and preferably between 500 and 20,000, as measured by gel permeation chromatography (GPC) in accordance with ASTM D 3016-78, ASTM D 3536-76, ASTM D 3593-80.

Crosslinking agents can be formed by reacting the polycarboxylic acid or its functional equivalent thereof with polyols at an elevated temperature, usually reflux temperature, in the presence of an esterification catalyst such as an acid or a tin compound. Usually a solvent, for example, an azeotropic solvent such as toluene or xylene, is used. Reaction is continued with water being constantly removed until a low acid value, for example, 3 or less, is obtained. Diesters, triesters, and polyesters with terminal ester groups can be crosslinked with the catalyst combination of this invention when formulated with high hydroxyl content polyesters. Formulations with low molecular weight diesters can be prepared at 100% solids, with a loss of condensation by-product of about 10 to 25 weight percent during cure. Films have been prepared with a pencil hardness of H, 100 MEK rub solvent resistance, and 140-inch pounds forward and reverse impact resistance.

Coating compositions can be formulated from one or more of the various ester-containing components, one or more of the hydroxyl-containing components, and various blends of catalyst components. Generally, the coating will be formulated with about equal quantities of the coreactive esters and alcohols although other ratios are useful. The coatings may include other less reactive esters or alcohols that are not considered in determining this reactive ratio. Likewise reactive diluents containing only a single reactive ester or reactive alcohol can be included in the coatings formulation in order to reduce viscosity if so desired.

Cure conditions vary with the concentration of relative amounts of the catalyst combination as well as the type of alcohol which leaves during the transesterification reaction. Lower boiling alcohols allow faster, lower temperature cures than higher boiling alcohols. The lowest cure time and temperature attainable as a single package containing with a useful shelf life of greater than two weeks is about 200° F. for five minutes. Higher temperatures and longer times are required if the coating is formulated for longer shelf life. Alternatively, milder curing conditions are possible if at least one of the two catalyst components is withheld from the coatings composition until soon before or during application.

The ratio of ester polymer to hydroxyl polymer can vary widely and can range between about 30 and 300 equivalent ester groups per 100 equivalents of hydroxyl groups. On a weight basis, between about 5 and 1,000 weight parts of ester polymer can be combined with 100 weight parts of hydroxyl polymer.

In accordance with this invention, transesterification is achieved to provide crosslinking between the "ester polymer" and the "hydroxyl polymer" by curing the respective polymers in the presence of catalytic amounts of an conjugated base of a weak acid and epoxy resin material. In practice, the inorganic salt reacts with the catalytic epoxy compound oxirane group to form the following complex:

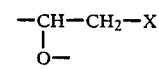

which occurs in-situ within the mixture of polymers, where X is sodium, potassium, or lithium. The complex then reacts with the ester group of the "ester polymer" to cleave the ester group and form a catalytic species of a low molecular weight alkoxy radical cleaved from the ester polymer. Then, the cleaved alkoxy radical interreacts with the hydroxyl group on the "hydroxyl polymer" to form an activated alkoxy polymer, and a low molecular weight alcohol. The volatile alcohol can easily leave the curing polymer film. Meanwhile, the polymeric alkoxy radical from the hydroxyl polymer activates a second ester group on an "ester polymer" whereupon the activated second ester group liberates a small molecule alkoxy species and an ester bond is formed. The cleaved alkoxy radical repeats the activation between a second hydroxyl group, and a third ester group which further promotes the crosslinking between the "ester polymers" and the "hydroxyl polymers" while regenerating alkoxy radicals and liberating more volatile alcohol molecules..

The following are illustrative examples, and, unless otherwise indicated, parts and percentages are by weight and temperature is given in degrees Centigrade. For evaluation purposes in the examples, coatings were applied at 1–2 mil thickness to phosphate treated cold-rolled steel panels and baked for 20 minutes at 350° F. Film properties were evaluated using the following evaluation:

(1) marring after 100 MEK double rubs;
(2) pencil hardness;
(3) MEK double rubs (MEK DR) consisted of a cotton rage wrapped around the index finger, soaked with methylethyl ketone and then wiped with a 2-inch stroke across the coated surface. Up and back motions with moderate pressure are counted as one rub. The rage was resoaked with MEK after each 20 rubs. The number of rubs was recorded to the point where the coating is just removed, or after 100 rubs record percentage of mar if the coating has not been removed.

EXAMPLE 1

Procedure "A"

Monesters of Dicarboxylic Acids From Their Anhydrides

Monoesters of succinic acid and maleic acid were prepared by simply heating a mixture of the cyclic acid anhydride and an alcohol. Thus, 200 g succinic anhydride was combined with 76.8 g of Fisher absolute methanol (20% mole excess). This mixture was heated with stirring in a 500 ml. 3-neck flask to 100° C. and half for 1 hour. Methanol refluxed at 65° C., but boiling subsided as the anhydride flakes dissolved, and the temperature gradually climbed to 100° C. The ester product was cooled to 70° C. before it was poured into a 9×13 inch flat glass baking dish. The white crystalline product was air dried for 2 hours to remove excess alcohol.

Procedure "B"

Epoxy From Monoesters of Dicarboxylic Acids

Epoxy esters were formed from monoesters of dicarboxylic acids.

| | |
|---|---|
| 120 g | monomethyl succinate (from "A" above) |
| 167 g | EPON 828 (bisphenol A diglycidyl ether) |
| 0.8 g | benzyldimethylamine |

Heat the above to 100° C. under a nitrogen blanket and hold for 3 hours. Cool. Titrate product for acid and epoxy. Values should fall between 0.2 and 0.4 MEQ/g. The polymer product of this reaction contains two methyl esters from the monomethyl succinate and two hydroxyls from the opened epoxide ring. Prepare solution for testing by dissolving in MEK at 50% NV.

Procedure "C"

Prepare a polyester resin from the following:

| | Grams |
|---|---|
| butyl stanoic acid | 2.0 |
| Dimethyl adipate | 1053 |
| dimethyl isophthalate | 1164 |
| trimethylol | 1074 |

1. Heat to 180° C. under N$_2$ blanket with stirring.
1. Collect methanol over a 2 hour period, while raising temperature to 190° C.
Cool when total distillate collected reaches 446 g.

Procedure "D"

Prepare an acrylic polymer from the following:

| | | Grams |
|---|---|---|
| (a) | methylamyl ketone | 670 |
| (b) | t-butyl perbenzoate | 40 |
| | methyl methacrylate | 1179 |
| | styrene | 300 |
| | 2-hydroxyethyl acrylate | 414 |
| | butyl acrylate | 170 |

1. Heat (a) to 140° C. and hold under N$_2$ blanket.
2. Pump in (b) mix over 3 hours while holding 140° C. with stirring. Hold 15 minute. Add 2 g t-butyl perbenzoate. Hold 30 minutes at 140° C.
3. Strip off solvent and residual monomer under vacuum. Total distillate 703 g. (170° C. maximum temperature).
4. Cool.
5. Prepare solution for testing by blending 50 g methylethyl ketone and 50 g. acrylic.

TABLE I

| Example | Resin | Salt | MEK DR | Mar | Pencil Hardness |
|---|---|---|---|---|---|
| 1 | D | none | 15/thru | — | — |
| 2 | D | KCl | 60/thru | — | F |
| 3 | D | KBr | 40/thru | — | F |
| 4 | D | KI | 50/thru | — | F |
| 5 | D | KCN | 100 | 50% | 2H |
| 6 | D | KOH | 100 | 10% | 2H |
| 7 | D | Na azide | 100 | 90% | 3H |
| 8 | D | Ca Br$_2$ | 60/thru | — | HB |
| 9 | D | Ca I$_2$ | 60/thru | — | HB |
| 10 | D, no epoxy | KCN | 60/thur | — | — |
| 11 | B | NaN$_3$ | 100 | 50% | H |
| 12 | C | NaN$_3$ | 100 | 10% | H |

EXAMPLE 13

Prepare resins for testing by combining with 5% EPON 828 (epoxy resin, equivalent weight 200). Salts listed in Table I were dissolved in 2 g 50/50 MeOH/H$_2$O to give 0.002 moles salt solution. This solution was blended with 10 g of the epoxy/resin catalyst mixtures. The catalyzed resins were spread on cold rolled steel panels to give 1–2 mill films, and then baked at 350° F. for 20 minutes. Film properties were measured after at least 5 minutes cooling.

Cures and hardness were obtained with the potassium halide salts. The more basic nucleophiles, (cyanide, azide, and hydroxide) gave superior solvent resistance and better hardness. KCN without epoxy produced films which were clearly inferior to Examples 5 which contain 5% epoxy.

The foregoing description and illustrative examples set forth the merits of transesterification cure using a catalyst combination of an inorganic salt in combination with an epoxy, but are not intended to be limited except by the appended claims.

We claim:

1. In a thermosetting coating composition having a polymeric binder comprising an ester polymer chain containing an ester group and a hydroxyl polymer chain containing a hydroxyl group, where the ester functional polymer chain and hydroxyl polymer chain are adapted to be activated to crosslink by transesterification in the presence of a transesterification catalyst;

said transesterification catalyst comprises between 1 and 20 weight parts of catalytic epoxy compound containing oxirane functionality selected from an oxide or an epoxide, and between 0.1 and 10 weight parts of inorganic salt having a cation selected from sodium, potassium, lithium, calcium, and iron per 100 weight parts of said polymeric binder where said polymeric binder is substantially free of carboxyl functionality and has an Acid No. less than 20; and where said inorganic salts contain an anion selected from a halogen, azide, cyanide or hydroxide.

2. The coating composition of claim 1 wherein the inorganic salt is a sodium salt.

3. The coating composition of claim 1 wherein the inorganic salt is a potassium salt.

4. The coating composition of claim 1 wherein the inorganic salt is a lithium salt.

5. The coating composition of claim 1 where the inorganic salt is a calcium salt.

6. The coating composition of claim 1 wherein the inorganic salt is an iron salt.

7. The coating composition of claim 1 wherein the ester polymer chain comprises an ester polymer having a number average molecular weight measured by GPC between 200 and 50,000.

8. The coating composition of claim 1 where the hydroxyl polymer chain comprises a hydroxyl polymer having a number average molecular weight between 200 and 50,000.

9. The coating composition of claim 1 where the ester polymer chain and hydroxyl polymer chain each comprises a polymer having a number average molecular weight between 500 and 20,000.

10. The coating composition of claim 1 wherein the epoxy compound is selected from the group consisting of 2-18 carbon alkylene oxide, aryl alkylene oxide, cycloaliphatic oxide, and phenolic glycidyl ether, and where the epoxy compound has at least one oxirane group per molecule.

11. The coating composition of claim 1 wherein the epoxy compound is selected from an oligomer, a monomer, or a polymer, and where the epoxy compound contains at least one oxirane group per molecule.

12. The coating composition of claim 1 where the polymeric binder is selected from the group consisting of a polyester, a polyacrylate, a polyepoxy, a polyamide, a polyurethane, a polycarbonate, or mixtures thereof.

13. The coating composition of claim 1 wherein the polymeric binder is solvent-free and comprises an oligomer polyester polyol and a lower alkyl diester of an alkyl dicarboxylic acid.

14. The coating composition of claim 1 where the polymeric binder comprises (a) a hydroxyl functional resin or polyol, and (b) a carboxylic acid ester or carboxylic ester functional resin.

15. The coating composition of claim 14 where the polymeric binder comprises (a) between 40% and 95% by weight polyester polyol, and (b) between 5% and 60% by weight lower alkyl diester.

16. The coating composition of claim 12 wherein the coating is a solvent based or solvent free acrylate polymer.

17. The coating composition of claim 1 wherein said inorganic salt is a halogen salt selected from a chloride, bromide, or iodide.

18. The coating composition of claim 1 where the inorganic salt contains a halogen anion.

* * * * *